United States Patent
Dear

(10) Patent No.: US 9,013,775 B2
(45) Date of Patent: Apr. 21, 2015

(54) ROTATING SPECTRAL DISPLAY DEVICE

(71) Applicant: David Dear, Westport, CT (US)

(72) Inventor: David Dear, Westport, CT (US)

( * ) Notice: Subject to any disclaimer, the term of this patent is extended or adjusted under 35 U.S.C. 154(b) by 368 days.

(21) Appl. No.: 13/730,802

(22) Filed: Dec. 28, 2012

(65) Prior Publication Data

US 2014/0185120 A1    Jul. 3, 2014

(51) Int. Cl.
*G02B 26/08*    (2006.01)
*G02B 26/00*    (2006.01)
*A47F 11/06*    (2006.01)
*G02B 27/08*    (2006.01)
*B44F 1/06*    (2006.01)

(52) U.S. Cl.
CPC ............. *G02B 26/007* (2013.01); *A47F 11/06* (2013.01); *G02B 27/08* (2013.01); *B44F 1/06* (2013.01)

(58) Field of Classification Search
CPC ...... G02B 27/08; G02B 26/007; A47F 11/06; B44F 1/06; Y02E 10/50; Y02E 10/52; Y02E 10/40; Y02E 10/43
USPC ................... 359/209.1–211.5, 221.2; 40/427, 40/430–431, 433
See application file for complete search history.

(56) References Cited

U.S. PATENT DOCUMENTS

| | | | |
|---|---|---|---|
| 5,706,594 | A  | 1/1998  | Lin |
| 6,263,600 | B1 | 7/2001  | Brink |
| 6,393,744 | B1 | 5/2002  | Snyder |
| 6,594,929 | B2 | 7/2003  | Butcher |
| 7,153,022 | B2 | 12/2006 | Dear |
| 2004/0207924 | A1 | 10/2004 | Chen |

FOREIGN PATENT DOCUMENTS

JP    10-10411    *    1/1998

* cited by examiner

*Primary Examiner* — James Phan
(74) *Attorney, Agent, or Firm* — Cascio & Zervas

(57) ABSTRACT

A solar powered rainbow-making device produces a visual display that is created by the interplay of light and a light refractive element that form constantly changing patterns from a rotating crystal. The rotating display device includes a circular-shaped refractive element that is mounted on a base and is turned by a motor driven transmission gear train. The crystal rotates about a horizontal axis as sunlight is transformed into a color spectrum that moves in a circular fashion. The color images can include a plurality of distinct rainbow images that are projected onto the walls and other structures in the immediate environment.

7 Claims, 3 Drawing Sheets

ROTATING SPECTRAL DISPLAY DEVICE

FIELD OF THE INVENTION

The invention is directed to an ornamental rotating apparatus with a rotatable optically refractive display element that produces one or more spectra and imparts a constantly changing visual pattern that can be created by the interaction of light with the refractive element. The refractive element, which is mounted on a stationary base, turns on a horizontal axis. The novel apparatus can be solar powered for energy efficiency in which case external light serves to operate the display device as well as providing light for the creation and transformation of the visual display.

BACKGROUND OF THE INVENTION

Conventional indoor and outdoor display devices such as mobiles, wind chimes and mirrored balls become rather lackluster, static or repetitive in just a short time and thereafter are relegated to an obscure corner of a room or backyard. The entertainment value of current display items is minimal given that once a display is configured the visual effects of the display are fixed. Lava lamps are decorative lamps in which globules of one liquid are suspended in another liquid. As the lamp is heated, the globules "boil" and rise in the second liquid and fall back as the globules cool thereby simulating the flow of volcanic lava. Lava lamps pose safety concerns since the liquids must be heated to a fairly high temperature.

U.S. Pat. No. 7,153,022 to Dear describes a crystal display device that includes a vertically arranged photovoltaic cell, main device housing that encases an electric motor and transmission, and a suspended refractory crystal. The display is typically mounted on the windowpane with a suction cup so that the crystal hangs freely and rotates to provide a multicolored display.

The industry is in search of exciting novelty items, which afford visual interest with a degree of unpredictability in its presentation. Particularly desired are novelty items that exhibit as robust, environmentally integrated display that is derived from the use of materials that interact with external light and other natural elements.

SUMMARY OF THE INVENTION

The present invention is directed to a standing device where the visual display is created by the interplay of light and a light refractive element that form constantly changing patterns from a rotating crystal. The rotating display device includes a typically circular refractive element that is mounted on a base and is turned by a motor driven output gear that is powered by solar energy. The rotating display device uses external light as a power source and as an integral component in generating a visual, rainbow-like display.

DETAILED DESCRIPTION OF THE PREFERRED EMBODIMENTS

Figure 1:
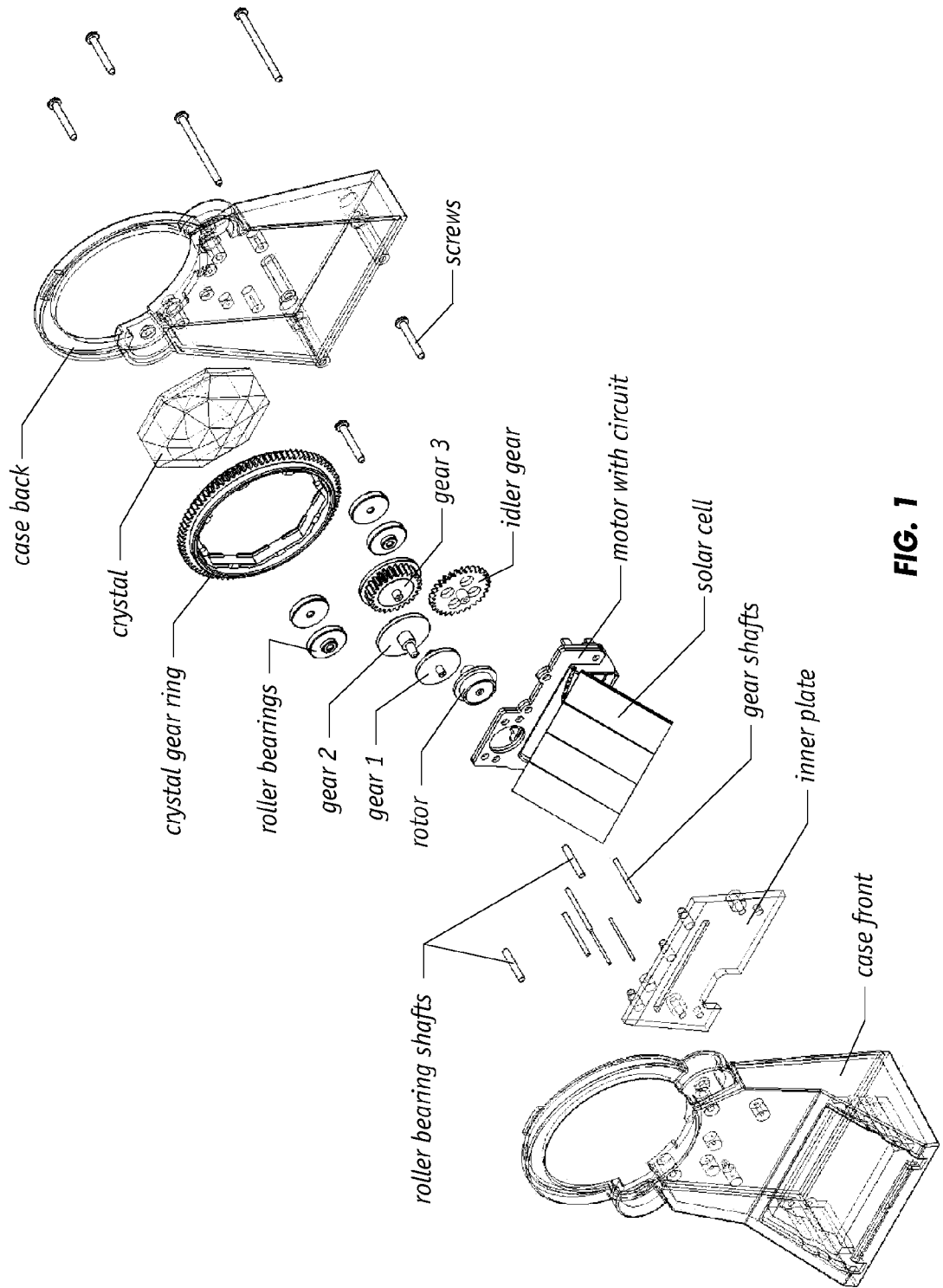
FIG. 1 is an exploded view of a solar powered rotating display.

FIG. 1 depicts the main components and their arrangements that form the rotating spectral display device of the present invention. The rainbow-maker device preferably uses solar energy to create a moving display of rainbows around the environment. The device include a solar panel that consists of one or more photovoltaic cells, an electric motor with a controller circuit, a gear train that includes gears 1, 2 and 3, and a light refracting crystal that is set into the center of a geared ring. The crystal and geared ring assembly rests on roller bearings and spins freely on a horizontal axis. When sunlight activates the photovoltaic cells electrical energy is created which feeds into a circuit that powers the motor and starts the rotor turning. The rotor drives the gear train, beginning with gear 1. The gear train reduces the speed of the motor. Gear 3 meshes with the crystal gear ring causing it to turn around a horizontal axis. The sunlight also passes through the crystal and the light is dispersed into its constituent spectral colors. The turning motion of the crystal causes the rainbows to move around the room in a circular fashion. A feature of this display device is that the crystal turns on a horizontal axis. The motor is a DC electric motor that is powered by electric current derived from the one or more photovoltaic cells, which can comprise polycrystal silicon solar cells. Alternatively, a battery can be employed to energize the motor.

Figure 2:
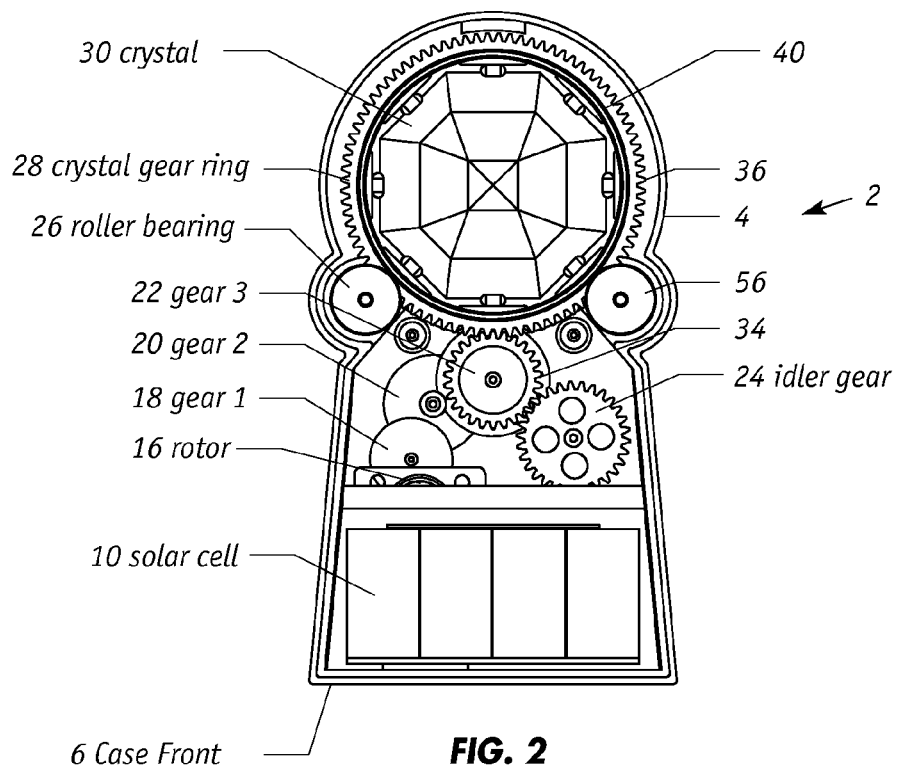
FIGS. 2, 3, and 4 are front, rear, and side elevational views, respectively, of a solar powered rotating display.
Figure 3:
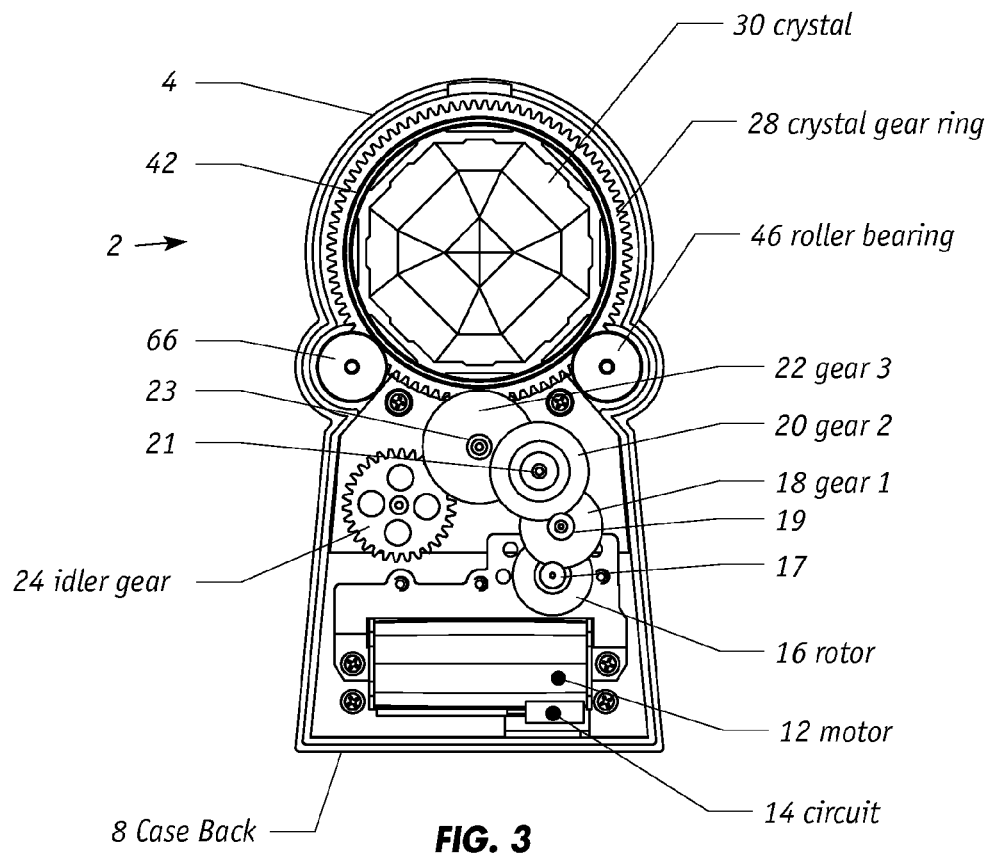
Figure 4:
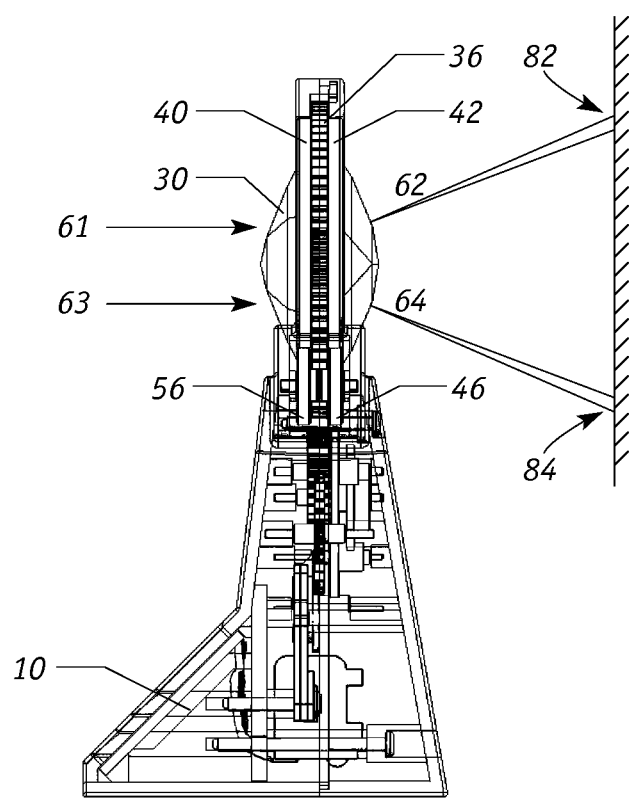

As shown in FIGS. 2, 3 and 4, photovoltaic cells 10 are preferably placed on the lower compartment within the case or housing 4 which includes a front case 6 and back case 8 with the cells being oriented in a slant position to intercept incident sunlight. A motor 12 with control circuit 14 is operatively connected to adjacent solar cells 10. Motor 12 is equipped with a rotor 16 having an output shaft 17. Crystal 30, which preferably has a circular outer perimeter, is centered and encased within crystal gear ring 28 that has exterior teeth 36. Crystal gear ring 28 defines outer, circular support ridges 40, 42 formed laterally on each side of exterior teeth 36 and that are positioned on two corresponding sets of dual roller bearings 26, 66 and 56, 46. As shown in the side view of FIG. 4, support outer ridge 40 is disposed on outer roller bearing 56 and outer ridge 42 is disposed on outer roller bearing 46.

A drive system includes a gear reduction system that allows motor 12 to drive the crystal gear ring 2. The drive system includes rotor 16 (with output shaft 17) and gears 18, 20 and 22, that have shafts 19, 21, and 23, respectively. Teeth 34 of gear 22 meshes with teeth 36 projecting from crystal gear ring 28. Idler gear 24, which is optional, adds visual interest as the gear train is typically encased in a transparent housing. In operation, energy from solar panel 10 activates motor 12 to drive output gear 22 to rotate crystal gear ring 28 about its central axis. This in turn, rotates crystal 30. As shown in FIG. 4, crystal 30 refracts incident light beams 61 and 63 to produce optical spectra of light 62 and 64, respectively that are projected onto the floor, walls, ceiling and/or other structures in the environmental where the device is displayed. Spectrum of light 62 and 64 form miniature, discrete rainbow images at positions 82 and 84, respectively, on a wall for instance. The number and size of such distinct rainbow images created will depend on the construction of the multifaceted crystal. Typically, many dozens of discrete rainbows can be generated. Thus, the optical spectra project a visual multicolor, rainbow-like pattern that moves in a circular path as created by the movement of crystal 30. In this regard, the crystal is preferably multifaceted and bilaterally symmetrical. It can be made of glass. It is understood that the crystal can comprise any suitable optically refractive element operative to refract light to produce an optical spectra.

The foregoing has described the principles, preferred embodiments and modes of operation of the present invention.

However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A rotating spectral display device that comprises:
   a base;
   a drive system that is positioned within the base and that includes a motor and a drive wheel;
   a cylindrical ring having a perimeter that is engaged to the drive wheel such that movement of the drive wheel rotates the cylindrical ring;
   an optically refractive element operative to refract sun light to produce an optical spectrum, wherein the optically refractive element is secured to the cylindrical ring so as to rotate about a horizontal axis; and
   a source of energy that is operatively connected to the motor.

2. The rotating spectral display device of claim 1 wherein the motor is an electric motor and the source of energy comprises at least one photovoltaic cell.

3. The rotating spectral display device of claim 1 wherein the drive system includes an output gear that engages the cylindrical ring wherein the outer perimeter of the cylindrical ring defines first and second lateral support ridges along the circumference of the cylindrical ring and wherein the rotating spectral display further includes two sets of dual bearing rollers on which the first and second lateral support ridges rest.

4. The rotating spectral display of claim 1 wherein the optically refractive element is configured to refract a plurality of beams of light into corresponding set of optical spectra.

5. A solar powered display for creating a color spectrum that moves in a circular pattern that comprises:
   a mounting assembly that includes a motor;
   a drive system that is operatively connected to the motor and which includes an output gear;
   a cylindrical ring having a perimeter that is engaged to the output gear such that movement of the output gear rotates the cylindrical ring;
   an optically refractive element operative to refract a beam of light to produce an optical spectra, wherein the optically refractive element is secured to the cylindrical ring so as to rotate about a horizontal axis; and
   at least one photovoltaic cell that is operatively connected to motor, wherein activation of the motor causes rotation of the cylindrical ring thereby producing the color spectra that follows a circular pattern.

6. The solar powered display of claim 5 wherein the optically refractive element is a multifaceted crystal that creates a plurality of distinct colored spectrum images that move collectively in a circular pattern.

7. The solar powered display device of claim 5 wherein the drive system includes an output gear that engages the cylindrical ring wherein the outer perimeter of the cylindrical ring defines first and second lateral support ridges along the circumference of the cylindrical ring and wherein the rotating spectral display further includes two sets of dual bearing rollers on which the first and second lateral support ridges rest.

* * * * *